United States Patent [19]

Thomas

[11] Patent Number: 4,668,487
[45] Date of Patent: May 26, 1987

[54] ALKALINE PROCESSING OF NATURALLY OCCURRING CALCIUM ALUMINIUM AND IRON PHOSPHATES

[76] Inventor: Griffith Thomas, 81 Lynbara Avenue, St. Ives, New South Wales, Australia, 2075

[21] Appl. No.: 788,094

[22] Filed: Oct. 16, 1985

Related U.S. Application Data

[63] Continuation of Ser. No. 621,730, Jun. 18, 1984, abandoned.

[30] Foreign Application Priority Data

Jun. 24, 1983 [AU] Australia ............................... PF9977
Jul. 14, 1983 [AU] Australia ............................... PG0279
Sep. 7, 1983 [AU] Australia ............................... PG1294

[51] Int. Cl.$^4$ .............................................. C01B 25/16
[52] U.S. Cl. .................................... 423/208; 423/131; 423/150; 423/167; 423/312
[58] Field of Search ............... 423/131, 150, 167, 312, 423/208

[56] References Cited

U.S. PATENT DOCUMENTS

| 1,360,248 | 11/1920 | Brobst | 423/167 |
| 1,799,882 | 4/1931 | Brenek | 71/47 |
| 2,220,790 | 11/1940 | McCullough | 423/312 |
| 2,221,356 | 11/1940 | Michels | 423/312 |
| 4,106,922 | 8/1978 | Hauschild et al. | 423/167 |
| 4,423,015 | 12/1983 | Roy et al. | 423/167 |

FOREIGN PATENT DOCUMENTS

| 296022 | 7/1929 | United Kingdom . |
| 389359 | 3/1933 | United Kingdom . |
| 908021 | 10/1962 | United Kingdom . |
| 1159660 | 7/1969 | United Kingdom . |
| 1403155 | 8/1975 | United Kingdom . |

Primary Examiner—John Doll
Assistant Examiner—Wayne A. Langel
Attorney, Agent, or Firm—Cushman, Darby & Cushman

[57] ABSTRACT

A process for production of alkali metal phosphates from material containing calcium, iron and aluminium phosphates, for example naturally occurring phosphate rocks, involves calcining the material with alkali metal carbonates to produce alkali metal phosphates, which are then leached from the calcined product under conditions that yield relatively concentrated solutions.

4 Claims, No Drawings

ALKALINE PROCESSING OF NATURALLY OCCURRING CALCIUM ALUMINIUM AND IRON PHOSPHATES

This is a continuation of application Ser. No. 621,730, filed June 18, 1984, which was abandoned upon the filing hereof.

This invention relates to the production of alkali metal phosphates from naturally occurring phosphate rocks.

The invention involves calcining the phosphate rocks with alkali metal carbonates to produce alkali metal phosphates, which are then leached from the calcined product under conditions that yield relatively concentrated solutions.

The composition of naturally occurring phosphate rocks varies according to the source. Some rocks, for example Florida rock, are predominantly calcium phosphate, while others, for example barrandite, are predominantly iron and/or aluminium phosphate. Other rocks such as Christmas Island C grade are complex mixtures of calcium aluminium and iron phosphates. The relative proportions of calcium phosphate, iron phosphate, aluminium phosphate and other components in rocks from different sources are subject to wide variation as is well known to persons skilled in the art.

The process of the present invention is varied, as indicated below, according to the composition of the starting material, in order to achieve the optimum results from the treatment of different types of rocks.

In a general aspect the invention provides a process for production of alkali metal phosphates from material containing calcium, iron and aluminium phosphates, characterized in that the said material is calcined with alkali metal carbonate and subsequently leached to yield alkali metal orthophosphates.

In one preferred embodiment of the invention a phosphate rock which is predominantly calcium phosphate is calcined with an alkali metal carbonate in the temperature range 800° to 1300° C. The resulting calcine is cooled and leached with water containing alkali metal carbonate into which carbon dioxide is sparged, yielding a solution of alkali metal orthophosphates and a residue of calcium carbonate.

The following simplified chemical reactions are believed to represent the process where Ak represents an alkali metal such as sodium or potassium.

$$Ca_3(PO_4)_2 + 2Ak_2CO_3 \rightarrow 2AkCaPO_4 + CaO + CO_2$$

$$2AkCaPO_4 + CaO + 2Ak_2CO_3 + CO_2 \rightarrow 2Ak_3PO_4 + 3CaCO_3$$

In a second form of the invention the same reactions are carried out, but iron and/or aluminium oxide is mixed with the phosphate rock and alkali metal carbonate to speed up the reaction rate.

In a third form of the invention a phosphate rock, which is predominantly iron and/or aluminium phosphate such as barrandite, is calcined with an alkali metal carbonate in the temperature range 800° to 1300° C. The resulting calcine is leached with water to form a solution of alkali metal orthophosphates and aluminate and a residue of iron hydroxide. The alkali metal orthophosphates are crystallized from solution by cooling. The residual solution can be further treated to recover aluminium trihydrate and alkali.

The following simplified chemical reactions are believed to typify the process where Ak represents an alkali metal such as sodium or potassium.

$$2FePO_4 + 3Ak_2CO_3 \rightarrow 2Ak_3PO_4 + 2AkFeO_2 + 3CO_2$$

$$2AkFeO_2 + 4H_2O \rightarrow 2Fe(OH)_3 + 2AkOH$$

$$2AlPO_4 + 3Ak_2CO_3 \rightarrow 3Ak_3PO_4 + 2AkAlO_2 + 3CO_2$$

$$AkAlO_2 + 2H_2O \rightarrow Al(OH)_3 + NaOH$$

or $$2AkAlO_2 + CO_2 + 3H_2O \rightarrow 2Al(OH)_3 + Ak_2CO_3$$

In a fourth form of the invention a phosphate rock containing calcium, iron and aluminium phosphate is calcined with an alkali metal carbonate in the temperature range 800° to 1300° C. The resulting calcine is leached with water in the presence of alkali metal carbonates and carbon dioxide. The resulting solution is separated from the solid residue and a solution of alkali metal orthophosphates and carbonate is formed.

The alkali metal orthophosphates are crystallized from the leach solution by cooling the residual solution and can be further treated to recover alkali metal carbonates. The simplified chemical reactions noted in the first and third forms of the invention are believed to typify the process.

In a fifth form of the invention phosphate rock containing calcium iron and aluminium phosphates is first leached with alkali metal hydroxides and carbonates to recover the phosphates associated with the iron and aluminium as orthophosphates and the aluminium as aluminium trihydrate. The residue, essentially iron hydroxide and calcium phosphate, is then fused with alkali metal carbonate to recover further phosphate by the method outlined under the first form of the invention.

In a sixth form of the invention a phosphate rock which is predominantly aluminium and iron phosphate is calcined with sodium or potassium carbonate at 800° to 1300° C. It is then leached with hot water to form a solution of alkali metal orthophosphates and alkali metal aluminates. This solution after freeing from the solid residue is cooled to crystallize out the alkali metal orthophosphates. It is then carbonated with carbon dioxide to precipitate aluminium trihydrate. The remaining solution, essentially alkali metal carbonates, is then evaporated to recover the carbonates which are recycled to the calcination step.

The process is believed to be represented by the following typical reactions.

$$2AlPO_4 + 3Ak_2CO_3 \rightarrow 3Ak_3PO_4 + 2AkAlO_2 + 3CO_2$$

$$2FePO_4 + 2Ak_2CO_3 \rightarrow 3Ak_3PO_4 + 2AkFeO_2 + 3CO_2$$

$$2AkFeO_2 + 4H_2O \rightarrow 2Fe(OH)_3 + 2AkOH$$

$$2AkAlO_2 + CO_2 + 3H_2O \rightarrow 2Al(OH)_3 + Ak_2CO_3$$

$$2AkOH + CO_2 \rightarrow Ak_2CO_3 + H_2O$$

ADVANTAGES

Two previous methods of providing alkali metal orthophosphates directly from naturally occurring phosphate rocks have been:

1. Fusion of calcium phosphates with alkali metal carbonates followed by leaching with water e.g. C. R. McCullough U.S. Pat. No. 2,220,790, Nov. 6, 1946.

2. Leaching of iron and aluminium phosphates with aqueous alkali metal hydroxides e.g. Rothbaum and Reeve, New Zealand Journal of Science, Volume 11, No. 4, December, 1968.

In the first method, the alkali metal phosphates revert to insoluble forms unless very dilute solutions are used. This reversion is probably due to the formation of calcium hydroxide during leaching and its subsequent reaction in solution to form calcium phosphate e.g.

$$Ca_3(PO_4)_2 + Na_2CO_3 \rightarrow 2NaCaPO_4 + CaO + CO_2$$

$$NaCaPO_4 + Na_2CO_3 \rightarrow Na_3PO_4 + CaCO_3$$

$$CaCO_3 \rightarrow CaO + CO_2$$

$$CaO + H_2O \rightarrow Ca(OH)_2$$

$$3Ca(OH)_2 + 2Na_3PO_4 \rightarrow 6NaOH + Ca_3(PO_4)_2$$

To obtain satisfactory yields of soluble phosphates by McCulloughs method very dilute and uneconomic solutions must be used. In my method, leaching in the presence of carbon dioxide ensures that calcium is in the form of unreactive calcium carbonate during leaching.

In the second method, alkali leaching will not solubilize the phosphorous associated with calcium in the case of a complex calcium iron aluminium phosphate such as Christmas Island C grade rock, and only that directly associated with iron and aluminium e.g 50–66% of the total phosphorous is solubilized. In my methods recoveries of over 90% of the total phosphorous in such rocks are achieved.

EXAMPLES

The invention will be further illustrated by the following non-limiting examples.

EXAMPLE 1

100g of ground Florida phosphate rock was mixed with 130g of sodium carbonate and calcined at 1200° C. for 1½ hours. The sinter was cooled, ground and leached with 150 gpl sodium carbonate bicarbonate solution at 75° C. Carbon dioxide was sparged into the leach solution to ensure at all times there was an excess of carbonate ions.

After 120 minutes of leaching the insoluble solids were separated from the solution and washed to recover solubles. The solution was cooled to 32° C. when most of the original phosphate in the rock crystallized out in the form of mixed crystals of hydrated di and trisodium orthophosphates.

The residual sodium carbonate bicarbonate solution was recycled to leach fresh sinter. By these means 92% of the phosphate in the original rock was recovered as sodium orthophosphates.

EXAMPLE 2

The experiment in Example 1 was repeated except that 5 g of aluminium trihydrate were added to the phosphate rock before calcining for 1½ hours at 1000° C. In subsequent leaching 94% of the original phosphate in the rock was recovered as sodium orthophosphates.

EXAMPLE 3

100g of Christmas Island C grade rock was ground, mixed with 150 g of potassium carbonate and calcined at 950° C. for 3 hours. The resulting sinter was cooled, ground and leached at 70° C. with 250 gpl potassium carbonate solution containing some potassium bicarbonate. During leaching carbon dioxide was passed into the leach solution to ensure bicarbonate ions were always present.

The solution was separated from insoluble solids and cooled to 33° C. when most of the phosphate in the original rock crystallized out as potassium orthophosphates. The residual solution was recirculated to leach a fresh batch of sinter. As excess potassium carbonate bicarbonate built up in the leach solution a portion of the solution was evaporated and was used to replace part of the potassium carbonate charge used for sintering.

By these methods I was able to recover over 90% of the phosphate in the original rock in the form of potassium orthophosphates.

EXAMPLE 4

100g of residue resulting from the caustic extraction of Christmas Island C grade rock was mixed with 130 g of sodium carbonate and calcined at 1150° C. for 2 hours. The resulting sinter was then leached at 65° C. with a solution of sodium carbonate in the presence of carbon dioxide. Insoluble solids were separated from the solution which was then cooled to 25° C. to yield crystals of sodium orthophosphates. The residual solution of sodium carbonates was recycled to extract the next batch of caustic extract residue.

By the combination of caustic extraction carbonate fusion and carbonate extraction in the presence of carbon dioxide I was able to recover 90% of aluminium and 93% of phosphate in the original rock.

EXAMPLE 5

100g of barrandite a naturally occurring iron and aluminium phosphate and which contained less than 3% calcium was mixed with 130 g of sodium carbonate and calcined at 1000° C. for 2 hours. The resulting sinter was ground and then leached with weak caustic sodium aluminate solution at 70° C. for 30 minutes. The insoluble solids were separated from the solution and the clear solution cooled to 20° C. to crystallize out sodium orthophosphates.

The residual solution containing sodium aluminate was then seeded with aluminium trihydrate, diluted with water to give a solution containing 120 g per liter of sodium measured as $Na_2O$. This suspension was then gently agitated for 24 hours to decompose the sodium aluminate to sodium hydroxide and aluminium hydroxide. The aluminium trihydrate was separated from the caustic soda and undecomposed sodium aluminate and the residual solution recycled to extract more sinter.

By the above means I was able to recover 90% of the aluminium and 92% of the phosphate in the original rock.

EXAMPLE 6

100g of barrandite was mixed with 150 g of potassium carbonate and heated at 1100° C. for 2 hours. The resulting sinter was leached with weak potassium carbonate solution at 70° C. and insoluble residue separates from the solution.

The clear solution was cooled to 30° C. and crystalline potassium orthophosphates separated from the residual solution of potassium aluminate containing some potassium phosphate and potassium carbonate. This residual solution was then carbonated with carbon dioxide precipitating aluminium trihydrate. The aluminium trihydrate was separated and the solution cooled further to 20° C. to crystallize and recover potassium carbonate. The weak solution of potassium carbonate remaining was recycled to leach a fresh batch of sinter. The recovered potassium carbonate crystals were used to replace a portion of the potassium carbonate in calcining other batches of barrandite.

The entire disclosures in my Australian provisional patent specifications PF 9977 filed June 24, 1983; PG 0279 filed July 14, 1983; and PG 1294 filed Sept. 7, 1983 are by this cross-reference incorporated into the present specification.

The claims defining the invention are as follows:

1. A process for the production of alkali metal phosphates and aluminium trihydrate from phosphate rock which contains calcium phosphate, iron phosphate and aluminum phosphate comprising leaching the rock with a solution containing alkali metal hydroxide and alkali metal carbonate to produce a solution containing aluminium trihydrate and alkali metal phosphates, recovering the aluminum trihydrate and alkali metal phosphates from the solution, calcining the residual solids from the leaching step with alkali metal carbonate, leaching the calcined material to yield alkali metal orthophosphates in solution and recovering the orthophosphates by cooling the solution to crystallize the orthophosphates.

2. A process as in claim 1 wherein the calcined material is leached with an aqueous solution of alkali metal carbonate containing carbon dioxide.

3. A process for production of alkali metal phosphates from naturally occurring phosphate rock containing calcium, iron, and aluminium phosphates in such amount that the total content of iron and aluminum, calculated as $Fe_2O_3$ and $Al_2O_3$ respectively, is greater than 5% by weight of said material, in which the rock is first leached with alkali metal hydroxides and carbonates to produce a solution containing aluminum trihydrate and alkali metal phosphates, said aluminium trihydrate and alkali metal phosphates are recovered from the solution and the residual solids are calcined with alkali metal carbonate, the calcined material being then leached to yield alkali metal orthophosphates in solution.

4. A process for production of alkali metal phosphates from naturally occurring phosphate rock containing calcium, iron, and aluminum phosphates in such amount that the total content of iron and aluminum, calculated as $Fe_2O_3$ and $Al_2O_3$ respectively, is greater than 5% by weight of said material, in which the rock is first leached with alkali metal hydroxides and carbonates to produce a solution containing aluminium trihydrate and alkali metal phosphates, the leach solution is cooled and said aluminium trihydrate and alkali metal phosphates are recovered from the solution by crystallization, and the residual solids are recycled and calcined with alkali metal carbonate to recover the phosphate therein.

* * * * *